United States Patent [19]

Bahner

[11] Patent Number: 5,104,157
[45] Date of Patent: Apr. 14, 1992

[54] QUICK-RELEASE CONNECTOR FOR HOSES AND THE LIKE

[75] Inventor: Frank Bahner, Neu-Isenburg, Fed. Rep. of Germany

[73] Assignee: Rasmussen GmbH, Maintal, Fed. Rep. of Germany

[21] Appl. No.: 591,735

[22] Filed: Oct. 2, 1990

[30] Foreign Application Priority Data

Oct. 7, 1989 [DE] Fed. Rep. of Germany ...... 3933590

[51] Int. Cl.⁵ .............................................. F16L 47/00
[52] U.S. Cl. .................................. 285/307; 285/314; 285/921; 285/351; 285/331
[58] Field of Search ............... 285/307, 39, 314, 351, 285/331, 332.1, 332, 921, 423, 401, 360, 73, 349

[56] References Cited

U.S. PATENT DOCUMENTS

| | | | |
|---|---|---|---|
| 3,588,149 | 6/1971 | Demler | 285/110 |
| 4,632,433 | 12/1986 | Kimura | 285/331 |
| 4,786,085 | 11/1988 | Sauer | 285/24 |
| 4,844,512 | 7/1989 | Gahwiler | 285/921 |
| 4,991,882 | 2/1991 | Gahwiler | 285/331 |

*Primary Examiner*—Dave W. Arola
*Assistant Examiner*—Tim Aberle
*Attorney, Agent, or Firm*—Peter K. Kontler

[57] ABSTRACT

A quick-release connector for a pair of conduits has a tubular male component which has a rear portion insertable into a first conduit, a front portion, an annular external protuberance between the front and rear portions, and several equidistance axially parallel disengaging members which cross the protuberance and have projections at their front ends. A tubular female component of the connector has a rear part which is insertable into the other conduit and a front part with equidistance axially parallel resilient arms, one for each disengaging member. The arms have internal detents which can engage a radial rear flank of the protuberance when the front portion of the male component is inserted into the front part of the female component. The detents can be disengaged from the rear flank of the protuberance in response to rotation of the two components relative to each other so that the detents ride onto the rear sections of the disengaging members behind the radial flank and can be moved axially toward but not over the projections. Complete disengagement of the two components is possible only when the detents are moved beyond the adjacent projections in the circumferential direction of the two components. Proper insertion of the male component into the female component is possible only when the projections can bypass the detents. The maximum width of each projection at least equals the maximum width of the rear section of the corresponding disengaging member.

11 Claims, 2 Drawing Sheets

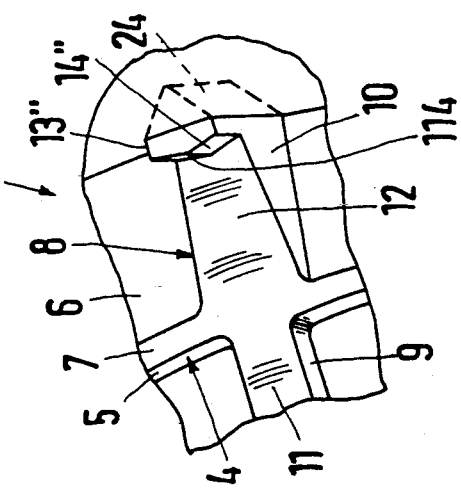
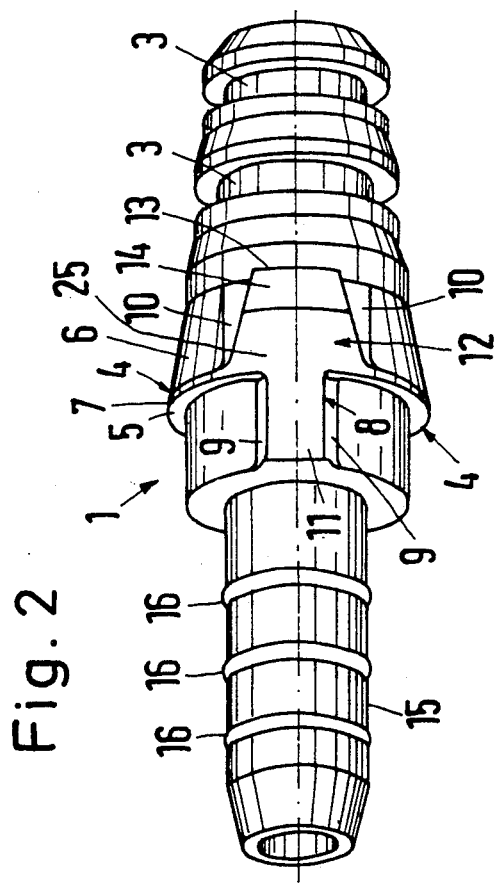
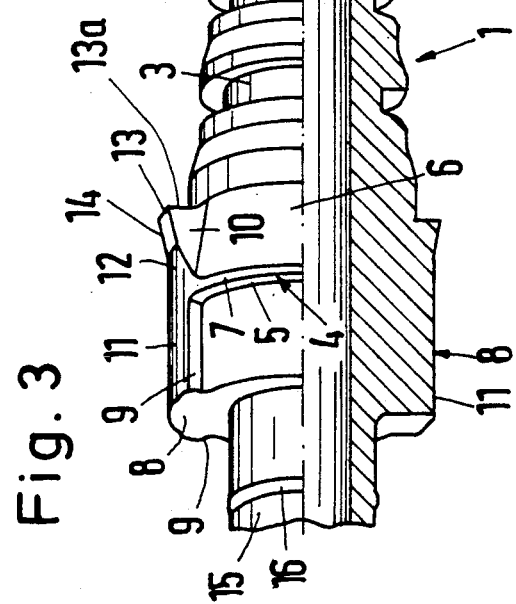
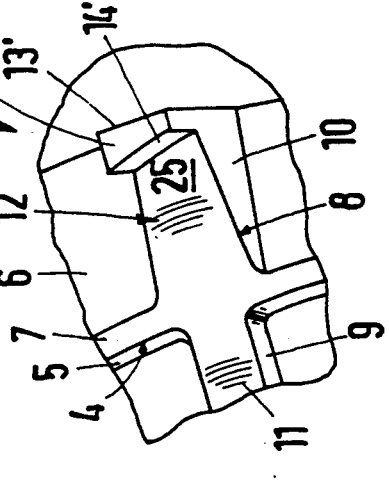

QUICK-RELEASE CONNECTOR FOR HOSES AND THE LIKE

BACKGROUND OF THE INVENTION

The invention relates to improvements in quick-release connectors or couplings for pairs of pipes, hoses or other types of conduits. More particularly, the invention relates to improvements in quick-release couplings of the type wherein a tubular male component has a rear portion which is insertable into or is otherwise connectable with one end portion of a first conduit, and a front portion receivable in the front part of a tubular female component having a rear part which is insertable into one end of or is otherwise connectable with a second conduit. Still more particularly, the invention relates to improvements in quick-release couplings wherein the front part of the female component has resilient arms with internal male detents having radial shoulders which can engage a radial rear flank forming part of an annular external protuberance which is provided on the male component between its front and rear portions and further comprises a conical front flank serving to spread the arms apart during insertion of the front portion of the male component into the front part of the female component. The detents then slide over the cylindrical peripheral surface of the protuberance between the front and rear flanks until the resilient arms are free to move toward each other and cause the shoulders of the detents to engage the radial flank of the protuberance on the male component.

It is already known to provide the male component of a quick-release connector of the above outlined character with axially parallel external disengaging members which cross the protuberance and have conical lateral flanks capable of moving the detents apart in response to turning of one of the components relative to the other component and/or vice versa so that the front portion of the male component can be extracted from the front part of the female component as soon as the shoulders of the detents move radially outwardly beyond the radial flank of the protuberance on the male component. The external surfaces of the disengaging members are flush with the peripheral surface of the protuberance, and the mutual spacing of disengaging members in the circumferential direction of the male component is the same as the mutual spacing of arms in the circumferential direction of the female component.

A quick-release connector of the above outlined character with several disengaging members on the male component is disclosed in commonly owned U.S. Pat. No. 4,786,085 granted Nov. 22, 1988 to Sauer et al. If the male component of the patented connector is not exactly coaxial with the female component (namely if the axis of one component is slightly inclined with reference to the axis of the other component) when the front portion of the male component is in the process of entering the front part of the female component in such orientation that each disengaging member is aligned with one of the arms, the internal detent of one of the arms is likely to reach the radially outermost portion of the aligned disengaging member before the detent or detents of the other arm or arms reach the radially outermost portion(s) of the respective disengaging member(s). This can lead an inexperienced or sloppy operator to the erroneous conclusion that the coupling operation has been completed whereas, actually, the detents merely overlie the aligned disengaging members but do not engage the radial rear flank of the protuberance. The two conduits can become disconnected from each other as soon as the pressure in one of the conduits rises because the pressurized fluid is likely to expel the front portion of the male component from the front part (including the resilient arms) of the female component.

U.S. Pat. No. 3,588,149 to Demler et al. discloses a vacuum or pressure coupling device wherein the male component carries two arcuate projections extending radially outwardly beyond the peripheral surface of the protuberance and serving to move the resilient arms of the front part of the female component away from each other in response to rotation of at least one of the components relative to the other component in either direction. A drawback of this coupling device is that the operator does not know for sure whether or not the two components are properly coupled to each other.

OBJECTS OF THE INVENTION

An object of the invention is to provide a quick-release coupling device or connector which is constructed and assembled in such a way that the operator can reliably ascertain whether or not the detents of resilient arms in the front part of the female component are properly engaged with the external protuberance of the male component.

Another object of the invention is to provide a quick-release connector which is less likely to permit accidental separation of the male and female components than heretofore known quick-release coupling devices or connectors.

A further object of the invention is to provide a novel and improved male component for use in the above outlined quick-release connector.

An additional object of the invention is to provide the male component with novel and improved disengaging means.

Still another object of the invention is to provide a quick-release connector which is constructed and assembled in such a way that the male component can be inserted into the female component only when the orientation of the two components relative to each other is such that engagement of detents at the inner sides of the arms of the female component with the external surfaces of the disengaging members is not possible.

SUMMARY OF THE INVENTION

The invention resides in the provision of a quick-release connector for two conduits, e.g., for two flexible hoses. The improved connector comprises an elongated tubular male component having a front portion, a rear portion which is connectable with (e.g., insertable into) one of the conduits, an annular external protuberance which is disposed between the front and rear portions and has a substantially radial rear flank confronting the rear portion, a conical front flank which slopes inwardly (toward the axis of the male component) toward the front portion, and a substantially cylindrical peripheral surface between the front and rear flanks, and a plurality of equidistant axially parallel disengaging members each of which crosses the protuberance and has a rear section or extension extending beyond the rear flank and a front section or extension at the front flank. The rear sections of the disengaging members have lateral ramps and the connector further comprises an elongated tubular female component including a rear part connectable with (e.g., insertable into) the other conduit and a front part having a plurality of axially parallel equidistant resilient arms, one for each disengaging member. Each arm includes an internal male detent having a cam face which is engaged by and yields radially outwardly to the front flank of the protuberance during insertion of the front portion of the male component into the front part of the female component and a substantially radial shoulder which is engaged by the rear flank of the protuberance on completed insertion of the front portion of the male component. The mutual spacing of the disengaging members in the circumferential direction of the male component is identical with the mutual spacing of the arms in the circumferential direction of the female component. At least one front section has a projection which extends radially outwardly beyond and is spaced apart from the peripheral surface of the protuberance in a direction toward the front portion of the male component. The detents are movable radially outwardly to predetermined outermost positions due to resiliency of the arms, and the distance of the projection from the common axis of the male and female components in inserted position of the front portion of the male component is greater than the distance of the detents from the common axis in the outermost positions of the detents. The projection includes a radially outermost portion having a predetermined first width in the circumferential direction of the male component, and the rear sections of the disengaging members include radially outermost portions having a second predetermined width which at most equals the first predetermined width.

Those end portions of the arms which are remote from the rear part of the female component are connected to each other by resilient arcuate portions of the front part of the female component. The detents can constitute the end portions of the arms, i.e., such detents can alternate with the arcuate portions of the front part of the female component.

The at least one front section of the one disengaging member further includes a connecting portion which is disposed between the projection and the peripheral surface of the protuberance. The connecting portion has a first preselected width at the projection and a second preselected width at the peripheral surface of the protuberance. The first preselected width at most equals the second preselected width, and the first preselected width can equal the first predetermined width. The width of the connecting portion can be constant or can increase gradually from the projection toward the peripheral surface of the protuberance. The arrangement can be such that the width of the projection varies gradually in a direction toward the connecting portion and that the width of the connecting portion varies gradually in a direction toward the peripheral surface of the protuberance at the same rate as the width of the projection.

The projection can be provided with a shoulder which confronts the peripheral surface of the protuberance and makes an oblique angle with the common axis of the male and female components in inserted position of front portion of the male component.

Alternatively the projection can be provided with a substantially roof-shaped shoulder confronting the peripheral surface of the protuberance and/or with a substantially roof-shaped shoulder which confronts the front portion of the male component. The projection can have a substantially radial ridge.

The novel features which are considered as characteristic of the invention are set forth in particular in the appended claims. The improved quick-release connector itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 2 is a different perspective view of the male component of the quick-release connector which is shown in FIG. 1;

FIG. 3 is a fragmentary third perspective view of the male component, with the lower half of the male component shown in an axial sectional view;

FIG. 4 is a fragmentary perspective view of a modified male component; and

FIG. 5 is a similar fragmentary perspective view of a third male component.

DESCRIPTION OF PREFERRED EMBODIMENTS

Figure 1:
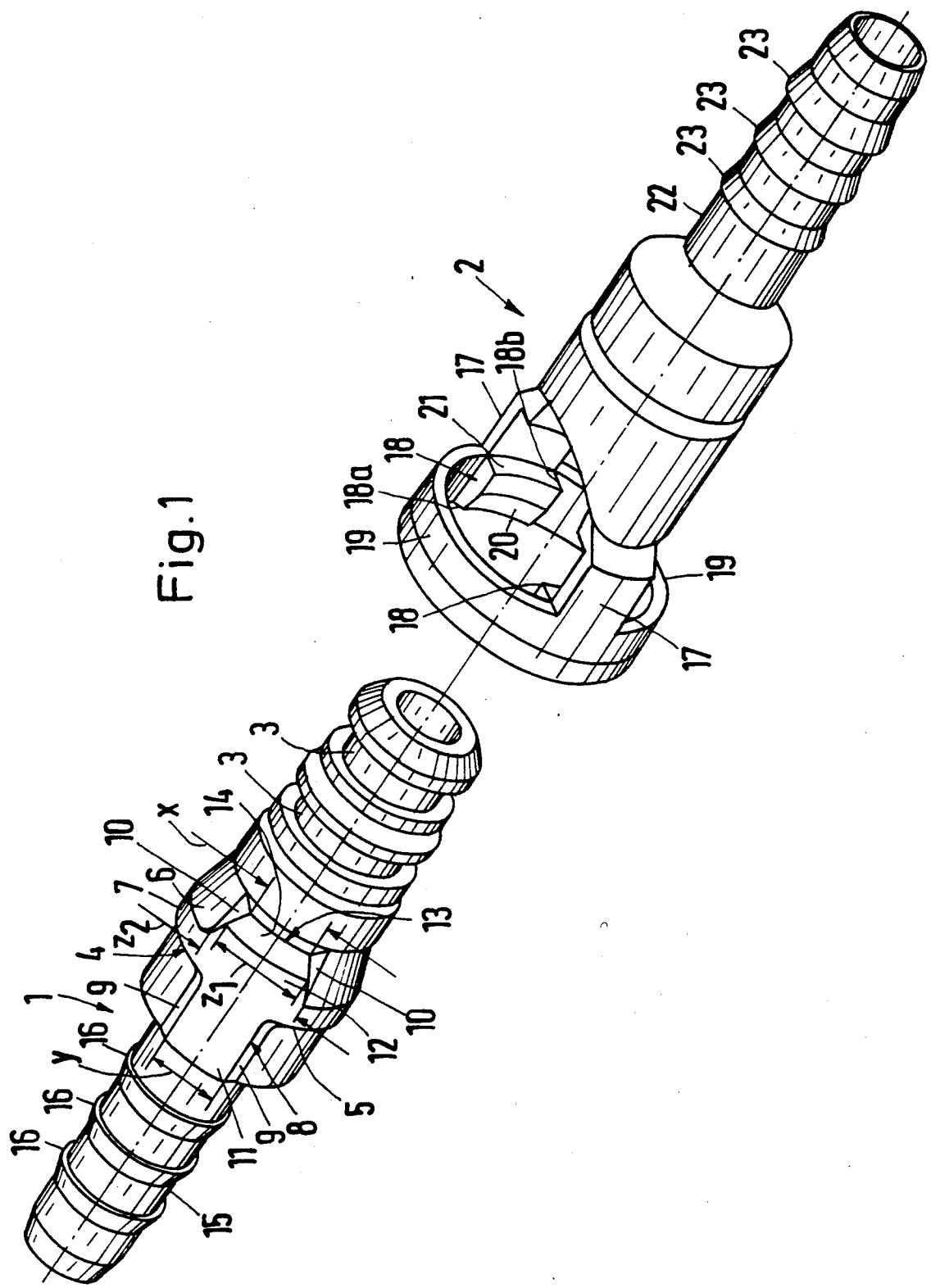
FIG. 1 is an exploded perspective view of a quick-release connector which embodies one form of the invention.

The quick-release connector or coupling of FIG. 1 comprises an elongated tubular male component 1 and an elongated tubular female component 2. The connector further comprises one or more O-rings (or analogous sealing elements) which are inserted into circumferential grooves 3 in the front portion of the male component 1 before such front portion is inserted into the front part (17–21) of the female component 2. The dimensions of the O-ring or O-rings are selected in such a way that each O-ring sealingly engages the external surface of the male component 1 as well as the internal surface of the female component 2.

The male component 1 further comprises a rear portion 15 with several external annular ribs or barbs 16. The rear portion 15 is insertable into one end of a flexible hose (not shown) or another conduit and can be permanently or separably held in the one end of such conduit by a suitable clamp or strap (not shown) of any known design. Still further, the male component 1 comprises an external annular protuberance 4 with a substantially radialy extending rear flank 5 and a conical front flank 6 which slopes toward the axis of the male component 1 in a direction toward the front portion including the grooves 3. The flanks 5, 6 are separated from each other by a cylindrical peripheral surface 7 of the protuberance 4. The male component 1 also comprises two axially parallel disengaging or uncoupling members 8 which are parallel to the axis of the male component and are disposed diametrically opposite each other, i.e., the members 8 are equidistant from each other in the clockwise or in the counterclockwise direction of the male component 1. Each disengaging member 8 crosses the protuberance 4 and includes a rear section or extension 11 which extends rearwardly beyond the radial flank 5 and a front section or extension 12 which is located at the conical front flank 6. Each section or extension 11 is flanked by two lateral ramps 9 which can be slightly or pronouncedly convex with gradual transitions into the radially outermost portions of the respective extensions or sections 11. Analogously, each front extension or section 12 is flanked by two lateral ramps 10 flanking a projection 13 and a connecting portion 25 of the respective section 12. Each ramp 10 can be rounded at its radially outer edge where it merges into the external surface 14 of the respective projection 13 and into the peripheral surface of the respective connecting portion 25.

The projections 13 are axially spaced apart from the peripheral surface 7 of the protuberance 4, and each connecting portion 25 extends from the peripheral surface 7 to the respective projection 13. The external surfaces 14 of the projections 13 slope outwardly in the axial direction of the male component 1 and away from the respective connecting portions 25. The width x (as measured in the circumferential direction of the component 1) of the foremost (i.e., radially outermost) portion of each projection 13 (i.e., of that portion which is remotest from the respective connecting portion 25) at least equals but can exceed the width y of the rearmost portion of the respective rear extension or section 11 (i.e., of that end portion of the section 11 which is remotest from the respective projection 13). Furthermore, the width $z_1$ of the foremost part of a connecting portion 25 (at the respective projection 13) matches the width of the rearmost part of the respective projection 13, but the width $z_2$ of the rearmost part of a connecting portion 25 (at the peripheral surface 7 of the protuberance 4) exceeds the width $z_1$. The arrangement is preferably such that the width of each connecting portion 25 increases gradually or steadily from $Z_1$ to $z_2$, i.e., from the respective projection 13 to the peripheral surface 7 of the protuberance 4. However, it is equally within the purview of the invention to provide two or more equidistant disengaging members 8 each of which has a front extension or section 12 with a connecting portion 25 of constant width (so that $z_1$ equals $z_2$). It is also possible to design the male component 1 in such a way that the width $z_1$ of each connecting portion 25 exceeds the width y of the respective rear section 11 (this is actually shown in FIGS. 1 to 3). In the embodiment of FIGS. 1 to 3, the width of each projection 13 increases from x to $z_1$ at the same rate as the width of the respective connecting portion 25 increases from $z_1$ to $z_2$. The external surface 14 of each projection 13 slopes toward the axis of the male component 1 in a direction toward the peripheral surface 7 of the protuberance 4. This can be readily seen in FIG. 3.

The male component 1 can be made of rather rigid but at least slightly resilient plastic material, the same as the female component 2. The front part of the female component 2 includes two axially parallel walls or arms 17 having internal surfaces provided with radially inwardly extending male detents 18 each of which has a conical cam face 20 at its front end and a substantially radial shoulder 21 at its rear end. In the embodiment of FIGS. 1 to 3, the detents 18 are provided at the front ends of the respective arms 17 and are integrally connected to each other by two arcuate portions 19 of the front part of the female component 2. The detents 18 and the arcuate portions 19 jointly form a radially deformable circumferentially complete ring at the front ends of the arms 17. The resiliency of the arms 18 and of the arcuate portions 19 should be sufficient to enable these elements to be flexed in response to insertion of the front portion (including the grooves 3) of the male component 1 into the front part 17-21 of the female component 2. The ring which includes the detents 18 and the arcuate portions 19 is then converted into an oval body and the distance between the radially innermost portions of the detents 18 then at least matches the diameter of the protuberance 4, i.e., such protuberance can advance into the female component 2 so that the radially extending rear flank 5 of the protuberance 4 can advance beyond the radial shoulders 21 of the detents 18. The conical cam faces 20 of the detents 18 are engaged and moved apart by the conical front flank 6 of the protuberance 4 during penetration of front portion of the male component 1 into the front part of the female component 2, and this results in conversion of the ring including the detents 18 and the arcuate portions 19 into an elliptical body.

When the front part 17-21 of the female component 2 is not deformed, the radii of curvature of the internal surfaces of arcuate portions 19 at least equal but preferably exceed the radius of the peripheral surface 7 but such radius is greater than the radii of curvature of internal surfaces of the detents 18. This ensures that the protuberance 4 can enter the ring 18-19 but that such ring undergoes deformation (as a result of movement of the conical front flank 6 against and along the cam faces 20) in response to further advancement of the protuberance 4 toward a rear part 22 of the female component 2. The rear part 22 has several circumferentially extending external ribs or barbs 23 and can be inserted into one end portion of a second flexible elastic hose (not shown) or another conduit which is to be separably coupled to the conduit surrounding the rear portion 15 of the male component 1. The end portion which surrounds the rear part 22 can be separably or permanently secured to the female component 2 by a standard strap, clamp or the like to prevent leakage of fluid from the respective conduit, along the external surface of the rear part 22 and toward the front part of the female component 2.

When the components 1 and 2 are held in the angular positions which are shown in FIG. 1 and the front portion of the male component 1 is pushed into the front part 17-21 of the female component 2, the cam faces 20 of the detents 18 are moved apart by the conical flank 6 and the ring including the arcuate portions 19 and the detents 18 is converted into an oval body, i.e., at least the front ends of the resilient arms 17 are moved apart (away from the axis of the female component 2). The peripheral surface 7 of the protuberance 4 advances between and inwardly beyond the detents 18 whereupon the arms 17 are free to reassume their undeformed states (i.e., to move their detents 18 radially inwardly so that the radial shoulders 21 of the detents 18 snap behind the radial flank 5 and prevent extraction of the front portion of the male component 1 from the front part of the female component 2 until and unless the component 1 is rotated relative to the component 2 and/or vice versa so that the ramps 9 of the rear sections 11 of the disengaging members 8 ride over and against the internal surfaces of the adjacent detents 18. This results in renewed deformation of the ring including the arcuate portions 19 and the detents 18 so that the shoulders 21 move radially outwardly beyond the radial flank 5 and the protuberance 4 can be partially extracted from the front part of the female component 2 or the female component can be partially slipped or pulled off the front portion (including the grooves 3) of the male component.

It will be seen that, in order to properly couple the components 1 and 2 to each other, it is necessary to select the angular positions of these components relative to each other in such a way that the detents 18 of the front part of the female component 2 are engaged by the conical front flank 6 of the protuberance 4 while the latter is in the process of entering the female component. On the other hand, partial separation of the components 1 and 2 necessitates an angular movement of at least one of these components (in a clockwise or counter-clockwise direction) in order to move the rear sections 11 of the disengaging members 8 between the detents 18 and to thus deform the ring 18-19 preparatory to partial extraction of the male component from the female component.

However, it is not possible to fully extract the component 1 from the component 2 as soon as the rear sections 11 of the disengaging members 8 are located between the detents 18. The reason is that, if the components 1 and 2 are pulled apart while the detents 18 abut the peripheral surfaces of the corresponding (adjacent) sections 11, the detents 18 slide toward the respective projections 13 (and/or the projections 13 advance toward the axially aligned detents 18) and the projections prevent complete extraction of the male component from the female component. This is due to the fact that the distance between the radially outermost portions of the external surfaces 14 (at x) exceeds the maximum achievable distance between the radially innermost portions of the detents 18. In other words, the ring including the arcuate portions 19 and the detents 18 cannot be deformed to such an extent that the projections 13 could be extracted from the front part of the female component 2 while sliding along the internal surfaces of the detents 18.

In order to ensure that the components 1 and 2 can be separated from each other, it is necessary to continue to rotate at least one of these components relative to the other component (with the front portion of the male component still confined in the female component) so that the detents 18 move beyond and slide off the peripheral surfaces of the adjacent connecting portions 25. When the components 1 and 2 reach such angular positions relative to each other, they can be separated with a minimum of effort because the projections 13 are then inwardly adjacent the arcuate portions 19 rather than the detents 18) and the peripheral surface 7 of the protuberance 4 is already located to the left of the detents 18 (as seen in FIG. 1). The outer diameters of O-rings or other suitable annular sealing elements in the grooves 3 of the front portion of the male component 1 are smaller than the minimum distance between the detents 18 in undeformed condition of the arms 17 so that the O-rings do not offer any appreciable resistance (or do not offer any resistance) to extraction of the male component 1 from the female component 2 in undeformed condition of the front part 17-21 of the female component 2.

If an operator wishes to insert the front portion of the male component 1 into the front part 17-21 of the female component 2 while the projections 13 are aligned with the detents 18, the radially extending front end faces 18a of the detents strike the front end faces 13a of the respective projections and prevent further insertion of the front portion of the component 1. Such engagement of front end faces 13a which the adjacent front end faces 18a does not cause any radially outward movements of the detents 18, i.e., the arms 17 remain undeformed and the elements 18-19 continue to form a ring which does not permit the conical front flank 6 of the protuberance 4 to move against the conical cam faces 20 of the detents 18 and to move the arms 17 apart for the purpose of permitting the rear flank 5 of the protuberance to advance toward and beyond the radial shoulders 21 of the detents. The front portion of the male component 1 cannot advance beyond a position in which the detents 18 prevent further inward movement of the male component as long as at least a portion of each front end face 18a is engaged by a portion of the adjacent front end face 13a, i.e., the male component 1 cannot fully enter the female component 2 when the projections 13 are in full axial alignment with the adjacent detents 18 as well as when at least a small portion of each projection abuts the adjacent detent. In other words, proper coupling of the components 1 and 2 to each other is possible only and alone when the projections 13 of disengaging members 8 on the male component 1 of FIGS. 1 to 3 are capable of bypassing the detents 18 of the arms 17 so that the projections 13 are not arrested by the front end faces 18a and the conical front flank 6 of the protuberance 4 can reach the conical cam faces 20 of the detents 18 in order to deform the ring 18-19 in the aforedescribed manner and permit the rear flank 5 to advance beyond the shoulders 21.

If the orientation of the components 1 and 2 relative to each other during insertion of the male component is such that each detent 18 is immediately or very closely adjacent one of the projections 13, the inclined ramps 10 of the front sections 12 act not unlike wedges or cams and cause the components 1, 2 to turn relative to each other (one axially parallel surface 18b of each detent 18 then slides along the adjacent ramp 10). This ensures that the detents 18 cannot ride onto the peripheral surfaces (i.e., onto the connecting portions 25 and projections 13) of the adjacent front sections 11 of the disengaging members 8. Thus, the ramps 10 of the rearwardly diverging or widening front sections 11 even further reduce the likelihood of movement of the front sections 11 into the spaces between the detents 18.

If an operator were to attempt to insert the front portion of the male component 1 into the front part 17-21 of the female component 2 while the axis of the component 1 is inclined relative to the axis of the component 2, namely in such a way that the cam face 20 of one of the detents 18 were to ride on the external surface 14 of the adjacent projection 13, the operator would still be prevented from properly inserting the male component into the other component. The reason is that the arm 17 for the detent 18 which rides on one of the projections 13 cannot undergo further deformation (radial movement away from the axis of the female component 2) because the detent 18 of the other arm 17 then engages the front end face 13a of the adjacent projection 13. As mentioned above, the maximum extent to which the arms 17 can move their detents 18 apart (away from the axis of the female component 2) is selected in such a way that the maximum distance between the detents 18 is less than the maximum distance between the radially outermost portions (at x) of the external surfaces 14 of the projections 13.

The number of arms 17 and disengaging members 8 can be increased to three or more without departing from the spirit of the invention. All that counts is to ensure that the mutual spacing of disengaging members 8 in the circumferential direction of the male component 1 matches the mutual spacing of detents 18 on the arms 17 as seen in the circumferential direction of the female component 2.

An important advantage of the improved quick-release connector is that the person in charge of connecting the components 1 and 2 to each other readily notes when the orientation of these components relative to each other is not proper for the establishment of a reliable connection. Thus, the projections 13 must be capable of completely bypassing the detents 18 before the conical front flank 6 of the protuberance 4 can actually reach and move apart the detents 18 so that the rear flank 5 can advance beyond the shoulders 21. The manipulation of the connector for the purpose of separating the properly coupled components 1 and 2 from each other is just as simple or practically just as simple as the disconnection of male and female components in conventional quick-release connectors. Thus, all that is necessary is to pull the components 1 and 2 apart while turning at least one of the components relative to the other components. This entails first an angular movement of the detents 18 onto the peripheral surfaces of the rear sections 11 of the disengaging members 8, thereupon an axial movement of the components 1, 2 relative to each other until the detent members 18 engage and are arrested by the adjacent projections 13, and finally a further angular movement of the detents 18 relative to the disengaging members 8 so that each detent can slide along the conical front flank 6 of the protuberance 4 whereby the front portion of the male component 1 can be fully extracted from the front part 17-21 of the female component 2.

The feature that the maximum width x of a projection 13 at least matches the width y of the corresponding rear section 11 and the minimum width of the corresponding connecting portion 25 at least equals x ensures that accidental turning of the male and/or female component beyond that in which the projections 13 are no longer aligned with the detents 18 does not result in movement of detents 18 onto the peripheral surfaces of the adjacent connecting portions 25 so that a pull upon the male component 1 (without renewed or further rotation) could not result in complete extraction of the front portion of the male component from the front part of the female component. If the width of the connecting portions 25 increases in a direction from the respective projections 13 toward the peripheral surface 7 of the protuberance 4, the ramps 10 of the front sections 12 can cause the two components to turn relative to each other (while the two components are being pulled apart) to further ensure that the detents 18 move circumferentially of the male component 1 and beyond the adjacent projections 13 to thus permit complete separation of the two components from one another.

The feature that the rate at which the width of a projection 13 increases linearly toward the peripheral surface 7 is the same as the rate of width increase of the respective connecting portion 25 ensures that not only those portions of the ramps 10 which flank the connecting portions 25 but also those which flank the respective projections 13 contribute to turning of the components 1, 2 relative to each other if one of these components is pulled in a direction to extract the front portion of the male component from the front part of the female component.

The arcuate portions 19 constitute optional but desirable and advantageous features of the front part of the female component 2. These arcuate portions permit the arms 17 to move toward and away from the axis of the component 2 but are preferably dimensioned to enhance the rigidity of the arms and to limit the extent of movability of the detents 18 away from each other so that the detents cannot permit extraction of the male component 1 from the female component 2 when at least a portion of each detent is in axial alignment with at least a portion of the adjacent projection 13. This renders it possible to provide the disengaging members 8 with projections 13 which extend only slightly beyond the adjacent connecting portions 25, i.e., it is possible to use projections which do not extend radially well beyond the adjacent portions of the respective disengaging members 8 because the maximum extent of movability of detents 18 away from each other can be selected with a high degree of accuracy.

FIG. 4 shows a portion of a modified male component 1. All such elements of this male component which are identical with or clearly analogous to corresponding elements of the male component 1 of FIGS. 1 to 3 are denoted by similar reference characters. The male component 1 of FIG. 4 comprises two or more equidistant disengaging members 8 (only one is actually shown in FIG. 4) wherein the projections 13' have shoulders 14' facing toward the rear portion of the male component, namely toward the peripheral surface 7 of the protuberance 4. The shoulder 14' is provided between the external surface 14 and the external surface of the connecting portion 25. This shoulder is inclined relative to and makes an oblique angle with the axis of the male component 1, i.e., the shoulder 14' is not located in a radial plane of the component 1. The purpose of the shoulder 14' is to facilitate disengagement of the male component 1 of FIG. 4 from a female component corresponding to the component 2 of FIG. 1. Thus, when the two components are properly coupled to each other and at least one of the components is turned relative to the other component in order to cause the detents 18 to ride over the ramps 9 and onto the adjacent rear sections 11, the radial shoulders 21 of the detents 18 slide along the non-radial shoulders 14' of the adjacent projections 13' to assist rotation of the component 1 and/or 2 relative to the other component. In fact, the inclination of the non-radial shoulders 14' on the projections 13' of the male component 1 which is shown in FIG. 4 can be so pronounced that a mere axial pull upon the male and/or female component suffices to cause the two components to turn relative to each other and to enable the detents 18 to ride along the adjacent ramps 9 and thereupon onto the external surfaces of the respective rear sections 11.

FIG. 5 shows a portion of a third male component 1 comprising two or more disengaging members 8 (only one shown) with projections 13" having roof-shaped shoulders 14" facing toward the peripheral surface 5 of the protuberance 4. The ridge 114 between the two facets of the roof-shaped shoulder 14" extends radially of the male component 1. An advantage of the shoulder 14" is that it promotes rotation of the male and female components relative to each other in a clockwise direction as well as in a counterclockwise direction when the operator wishes to disengage the male component from the female component. The inclination of the two facets of each roof-shaped shoulder 14" relative to a plane which is exactly normal to the axis of the male component 1 of FIG. 5 can be so pronounced that a mere pull upon the male and/or female component suffices to cause the two components to turn relative to each other.

In addition to or in lieu of the roof-shaped shoulder 14', each projection 13' of the male component 1 of FIG. 5 can be provided with a roof-shaped shoulder 24 (indicated in FIG. 5 by broken lines) which faces forwardly, i.e., away from the protuberance 4, and thus replaces the front end face 13a. The front shoulder 24 would enable the projection 13' to turn relative to the front end face 18a of the adjacent detent 18 to thus promote rotation of the male of female components relative to each other toward angular positions in which the projections 13" can bypass the detents 18 and the cam faces 20 of the detents can be engaged by the front flank 6 of the protuberance 4.

The front end faces 18a of the detents 18 can be replaced with non-radial shoulders corresponding to the shoulder 14' of FIG. 4 or with roof-shaped shoulders corresponding to the shoulder 14" of FIG. 5. Such modified detents can be used with the male component of FIGS. 1–3, FIG. 4 or FIG. 5. Furthermore, the axially parallel surfaces 18b of the detents 18 can be replaced with pairs of convergent surfaces which slope toward each other in a direction away from the rear part 22 so that each detent 18 would have a radially extending front ridge (for example, flush with the exposed front surfaces of the arcuate portions 19). This would further promote rotation of the male and female components relative to each other, not only when the thus modified detents were to engage the roof-shaped front shoulders 24 of the adjacent projections 13" but also on engagement with the projections 13 or 13'. In fact, the front ridges of modified detents 18 could automatically initiate a turning of the male and female components relative to each other in response to axial movement of projections 13, 13' or 13" against them.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A quick-release connector for two conduits, comprising a tubular male component having a longitudinal axis and having a front portion, a rear portion connectable with one of the conduits, an annular external protuberance disposed between said portions and having a radial rear flank confronting said rear portion and a conical front flank sloping inwardly toward said front portion, and a plurality of circumferentially equidistant axially parallel disengaging members each crossing said protuberance and each having a rear section extending axially beyond said rear flank and a front section at said front flank and extending axially forward of said front flank, said rear sections having lateral ramps and said protuberance having a peripheral surface between said flanks; and a tubular female component having a longitudinal axis and including a rear part connectable to the other conduit and a front part having a plurality of axially parallel circumferentially equidistant resilient arms, one for each of said disengaging members, each of said arms including an internal detent having a cam face engaged by and yielding radially outwardly to said front flank during insertion of said front portion into said front part and a substantially radial shoulder which is engaged by said rear flank on completed insertion of said front portion, the mutual spacing of said disengaging members in the circumferential direction of said male component being identical with the mutual spacing of said arms in the circumferential direction of said female component, at least one of said front sections having a projection extending radially outwardly beyond the circumferential surface of said front section and being spaced apart from said peripheral surface in a direction toward said front portion, said detents being movable radially outwardly to predetermined outermost positions due to resiliency of said arms and the distance of said projection from the common longitudinal axis of said components in inserted position of said front portion being greater than the distance of said detents from said axis in the outermost positions of said detents, said projection including a radially outermost portion having a first predetermined width in the circumferential direction of said male component and said rear sections including radially outermost portions having a second predetermined width which at most equals said first width, whereby to disengage said components said detents are aligned with said disengaging surfaces and the male and female components are axially moved apart until the detents engage the projection and upon relative rotation of said components, said components may be axially disengaged.

2. The connector of claim 1, wherein said projection has at least one circumferentially double tapered shoulder facing in one of two directions toward and away from said peripheral surface, said projection having a radially extending ridge.

3. The connector of claim 1, wherein said projection has a circumferentially double tapered shoulder confronting said front portion.

4. The connector of claim 1, wherein said projection has a circumferentially double tapered shoulder confronting said peripheral surface.

5. The connector of claim 1, wherein said projection has a shoulder confronting said peripheral surface and making an oblique angle with the common axis of said components in inserted position of said front portion.

6. The connector of claim 1, wherein said arms have end portions remote from said rear part and said front part further includes resilient arcuate portions connecting said end portions of said arms to each other.

7. The connector of claim 1, wherein said at least one front section further includes a connecting portion disposed between said projection and said peripheral surface, said connecting portion having a first width at said projection and a second width at said peripheral surface, the first width of said connecting portion being at most equal to the second width of said connecting portion and the first width of said connecting portion being equal to said first predetermined width.

8. The connector of claim 6, wherein said detents constitute the end portions of said arms.

9. The connector of claim 7, wherein the width of said connecting portion is constant.

10. The connector of claim 7, wherein the width of said connecting portion increases gradually from said projection toward said peripheral surface.

11. The connector of claim 7, wherein the width of said projection varies gradually in a direction toward said connecting portion and the width of said connecting portion varies gradually in a direction toward said peripheral surface at the same rate as the width of said projection.

* * * * *